(12) United States Patent
Lyons

(10) Patent No.: US 10,995,684 B1
(45) Date of Patent: May 4, 2021

(54) SMART ACTUATOR LEARN COMMAND PROCESS

(71) Applicant: International Engine Intellectual Property Company, LLC, Lisle, IL (US)

(72) Inventor: Timothy M. Lyons, Batavia, IL (US)

(73) Assignee: Internatinal Engine Intellectual Property Company, LLC., Lisle, IL (US)

( * ) Notice: Subject to any disclaimer, the term of this patent is extended or adjusted under 35 U.S.C. 154(b) by 0 days.

(21) Appl. No.: 16/691,112

(22) Filed: Nov. 21, 2019

(51) Int. Cl.
*F02D 23/02* (2006.01)

(52) U.S. Cl.
CPC .................... *F02D 23/02* (2013.01)

(58) Field of Classification Search
CPC ..................................... F02D 23/02
See application file for complete search history.

(56) References Cited

U.S. PATENT DOCUMENTS

| | | | |
|---|---|---|---|
| 8,112,995 B2* | 2/2012 | Pappakurichi Santhanam | F02B 37/24 60/602 |
| 2002/0187061 A1* | 12/2002 | Arnold | F01D 17/165 417/407 |
| 2010/0108045 A1* | 5/2010 | Enomoto | F02D 41/123 123/674 |
| 2010/0135773 A1* | 6/2010 | Kaufmann | F02D 41/0007 415/118 |
| 2016/0146131 A1* | 5/2016 | Hur | F02D 41/2464 60/602 |
| 2018/0106207 A1* | 4/2018 | Won | F02D 41/221 |
| 2019/0010814 A1* | 1/2019 | Racca | F01D 25/24 |

* cited by examiner

*Primary Examiner* — Joseph J Dallo
(74) *Attorney, Agent, or Firm* — Jack D. Nimz; Mark C Bach

(57) ABSTRACT

A variable geometry turbocharger (VGT) of an engine of a vehicle has a VGT mechanism and a VGT actuator connected to the VGT actuator. A controller is connected to the VGT actuator, and is configured to monitor at least one entry condition such as vehicle battery voltage, voltage at the VGT actuator, temperature of the engine, its oil, and its coolant, and exhaust gas temperature. If the entry conditions are met, the controller performs a learn procedure in which the VGT actuator cycles the VGT mechanism through its range of motion following a key-off shutdown command. The learn procedure may take place immediately preceding, during, or immediately following shutdown of the engine. The VGT actuator then reports to the controller an available range of motion of the VGT actuator and of the VGT mechanism.

18 Claims, 3 Drawing Sheets

SMART ACTUATOR LEARN COMMAND PROCESS

BACKGROUND

This disclosure relates to an arrangement and method for reliably determining the available range of motion of a variable geometry turbocharger (VGT), such as the available range of vane motion in a VGT that varies the angle of the turbine vanes. Particularly, this disclosure relates to an arrangement and method for reliably determining the available range of motion of a VGT notwithstanding premature cranking of the engine by an operator or a cold state of the engine.

RELATED ART

VGT's are designed to allow the effective aspect ratio of a turbocharger to be varied as the operating conditions of an engine change. This is done by varying the geometry of the turbine housing, or by varying the angle of the turbine vanes, in order to maintain optimum aspect ratio of the turbine at varying engine speeds. With VGT's that vary the geometry of the turbine housing, the axial width of the inlet may be selectively blocked by an axially sliding wall, or the area of the nozzle may be otherwise varied. With VGT's that vary the angle of the turbine vanes, the turbine vanes may rotate at their base so that the angle of attack of the turbine vanes changes and/or the effective gap between the turbine vanes changes. The configuration of the turbine housing and/or the angle of the turbine vanes, depending on the type of VGT used, is controlled by an actuator, which may be a vacuum actuator, an electric servo actuator, an air operated actuator, or a hydraulic actuator, as non-limiting examples. The actuator, in turn, may be controlled by a controller, such as an engine controller. Properly implemented and controlled VGT's may exhibit minimal lag, a low boost threshold, and high efficiency at higher engine speeds, and may not require the use of a wastegate.

It is known for an engine controller to issue a learn command to the variable geometry turbocharger (VGT) actuator at each key-on cycle of an engine. This learn process allows the actuator to determine for non-limiting example the available range of turbine vane motion for that particular key cycle, as well as to assess the relative condition of the variable geometry turbocharger itself compared to its as-new condition. The learn process takes approximately one half second to accomplish. However, if the vehicle operator cranks the engine before the learn process is completed, the voltage and power available to the actuator may be insufficient to complete the learn cycle, among other potential failure modes. This may result in a fault code being sent to the engine controller, the display of a malfunction indicator lamp (MIL), subsequent warranty costs, and lost vehicle uptime. In addition, issuing the learn command with a cold engine may not accurately reflect the range or motion of the VGT mechanism and/or actuator, for example if the turbine vanes are fully or partially frozen, which may again drive unnecessary warranty costs.

One known method of dealing with this problem partially addresses it by providing the engine controller with the ability to mask the diagnostic code, for example during a deficient battery condition. However, this method has the potential to allow an actual problem to go unreported for an extended period, such as if the battery condition remains deficient through multiple learn processes while a failure condition develops within the VGT mechanism and/or actuator. Accordingly, there is an unmet need for an arrangement and method for reliably determining for non-limiting example the available turbine vane motion of a VGT for a given key cycle, and/or the range of motion of its actuator, notwithstanding premature cranking of the engine by an operator or a cold state of the engine.

SUMMARY

According to one embodiment of the Smart Actuator Learn Command Process, a vehicle has an engine. A variable geometry turbocharger (VGT) of the engine has a VGT mechanism and a VGT actuator connected to the VGT actuator. A controller is connected to the VGT actuator, and is configured to monitor at least one entry condition. The controller is further configured such that, if the at least one entry condition is met, the controller performs a learn procedure using the VGT actuator. In the learn procedure, the VGT actuator cycles the VGT mechanism through its range of motion following a key-off shutdown command. The VGT actuator then reports to the controller an available range of motion of the VGT actuator and of the VGT mechanism.

According to another embodiment of the Smart Actuator Learn Command Process, an engine of a vehicle has a variable geometry turbocharger (VGT) with a VGT mechanism and a VGT actuator connected to the VGT actuator. A controller is connected to the VGT actuator and is configured to monitor at least one entry condition. The controller is further configured such that, if the at least one entry condition is met, the controller performs a learn procedure using the VGT actuator. In the learn procedure, the VGT actuator cycles the VGT mechanism through its range of motion following a key-off shutdown command. The VGT actuator then reports to the controller an available range of motion of the VGT actuator and of the VGT mechanism.

According to another embodiment of the Smart Actuator Learn Command Process, a method of determining the range of motion of a VGT mechanism and a VGT actuator of a VGT includes several steps. The first step is monitoring with a controller at least one entry condition. The second step is performing a learn procedure wherein the VGT actuator cycles the VGT mechanism through its range of motion following a key-off shutdown command, only if the at least one entry condition is met. The third step is the VGT actuator reporting to the controller an available range of motion of the VGT actuator and of the VGT mechanism.

DETAILED DESCRIPTION

Figure 1:
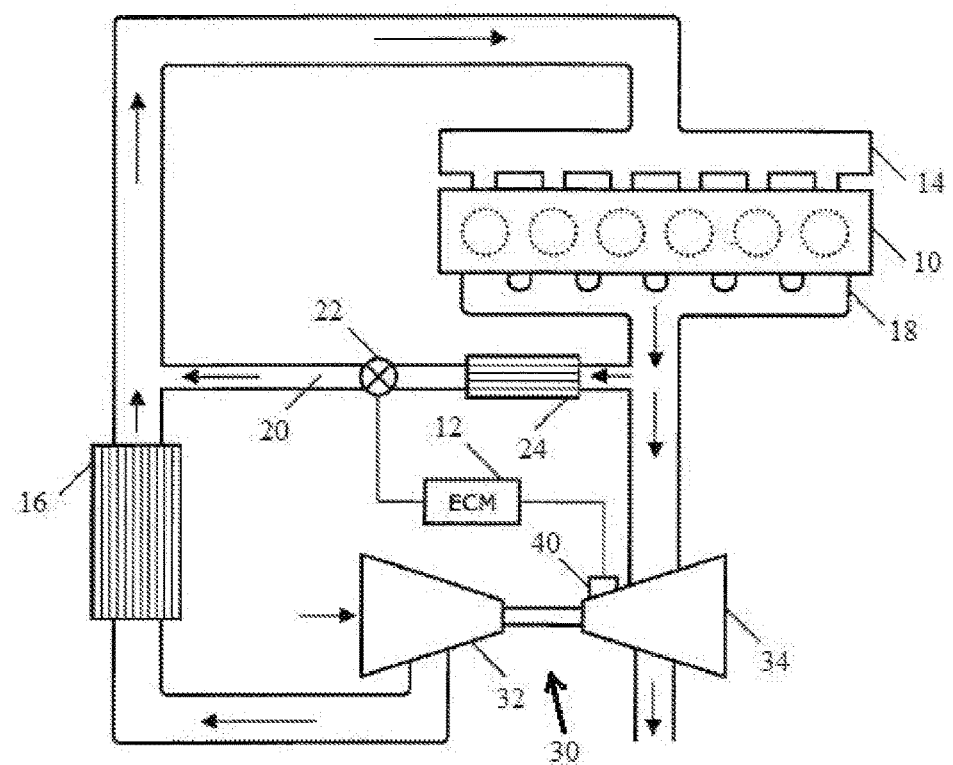
FIG. 1 is a schematic view of an engine exhaust and air intake system implementing an embodiment of the Smart Actuator Learn Command Process according to the present disclosure, as described herein.

Embodiments described herein relate to a Smart Actuator Learn Command Process and methods for the use thereof.

The Smart Actuator Learn Command Process and its method of use may be applied to engines used in various types of stationary applications, marine applications, passenger vehicles, and commercial vehicles and recreational vehicles, such as highway or semi-tractors, straight trucks, busses, fire trucks, agricultural vehicles, motorhomes, rail travelling vehicles, and etcetera. It is further contemplated that embodiments of the Smart Actuator Learn Command Process and methods for the use thereof may be applied to engines configured for various fuels, such as gasoline, diesel, propane, natural gas, and hydrogen, as non-limiting examples. The several embodiments of the Smart Actuator Learn Command Process and method for the use thereof presented herein are employed on vehicles utilizing the Otto cycle or the Diesel cycle, but this is not to be construed as limiting the scope of the Smart Actuator Learn Command Process and its method of use, which may be applied to engines of differing construction.

Embodiments of the Smart Actuator Learn Command Process and methods for the use thereof disclosed herein perform a learn procedure during a key-off engine shutdown process only when certain entry conditions are met. Specifically, the Smart Actuator Learn Command Process, which may be implemented by way of engine control software within a controller such as an engine controller, monitors certain vehicle and engine variables in order to determine if the engine and vehicle conditions are such that a learn cycle will be successful and/or beneficial. Such entry conditions may include, as non-limiting examples, a specified range of vehicle battery voltages, a specified range of voltages at the VGT actuator, a specified range of engine temperatures, a specified range of engine oil temperatures, a specified range of engine coolant temperatures, and a specified range of exhaust gas temperatures. One or more of these range values may be calibratable. Provided that these entry conditions are satisfied, the engine controller implementing an embodiment of the Smart Actuator Learn Command Process issues a learn enable command to the VGT actuator, and the VGT actuator performs the learn procedure.

When the engine controller issues the learn command to the VGT actuator, the VGT actuator cycles the VGT mechanism through its range of motion during the key-off engine shutdown process immediately preceding, during, and/or immediately following actual engine shutdown. Immediately preceding and/or immediately following actual engine shutdown means during the key-off engine shutdown process as opposed to before the key-off engine shutdown process begins or after the key-off engine shutdown process is complete. The VGT actuator then reports to the engine controller the available range of motion of the VGT mechanism, which may be for non-limiting example be the available range of turbine vane motion. In this way, the engine controller can optimize the performance of the VGT within the available range of motion of the VGT mechanism, as well as assess the relative condition of the VGT itself compared to its as-new condition. Furthermore, erroneous faults are avoided by eliminating the possibility that the learn procedure is performed with insufficient or excessive battery or VGT actuator voltage, or when the engine, engine oil, engine coolant, or exhaust temperatures are outside of their specified ranges. If the entry conditions not met, the engine controller implementing an embodiment of the Smart Actuator Learn Command Process may retain a previously determined available range of motion of VGT mechanism, for non-limiting example a previously determined range of turbine vane motion, and/or a previously determined range of motion of the VGT actuator. In this way, unnecessary warranty costs are avoided and vehicle uptime is maximized.

If the entry conditions are met and the learn procedure is performed, the engine controller implementing an embodiment of the Smart Actuator Learn Command Process may further identify any trends in the available range of motion of the VGT mechanism. Additionally, the engine controller implementing an embodiment of the Smart Actuator Learn Command Process may identify, determine, and/or report any correlations between the monitored vehicle and/or engine variables and the available range of motion of the VGT mechanism reported by the VGT actuator. These correlations may be used by the engine controller in further optimizing the performance of the VGT within an available range of motion of the VGT mechanism as predicted using the correlations, and/or may be used to predict, mitigate, and/or avoid impending failures.

Turning now to FIG. 1, an embodiment of an engine 10 having a VGT 30 using the Smart Actuator Learn Command Process according to the present disclosure is shown in a schematic view. The engine 10 is provided with an intake manifold 14 and an exhaust manifold 18. Intake air is conducted from a compressor 32 of the VGT 30 to the intake manifold 14 of the engine 10 by way of a charge air cooler 16. Exhaust from the engine 10 is conducted from the exhaust manifold 18 to a turbine 34 of the VGT 30, thereby resulting in increased power and efficiency from the engine 10. The turbine 34 of the VGT 30 is connected to and drives the compressor 32 of the VGT 30. An Exhaust Gas Recirculation (EGR) system 20 may conduct some of the exhaust from the exhaust manifold 18 to the intake manifold 14 by way of an EGR cooler 24 as controlled by an EGR control valve 22 for emissions control purposes. The VGT mechanism 36 (not shown in FIG. 1) of the VGT 30 is controlled by a VGT actuator 40. The EGR control valve 22 and/or the VGT actuator 40 are connected to and controlled by an engine controller 12.

Figure 2:
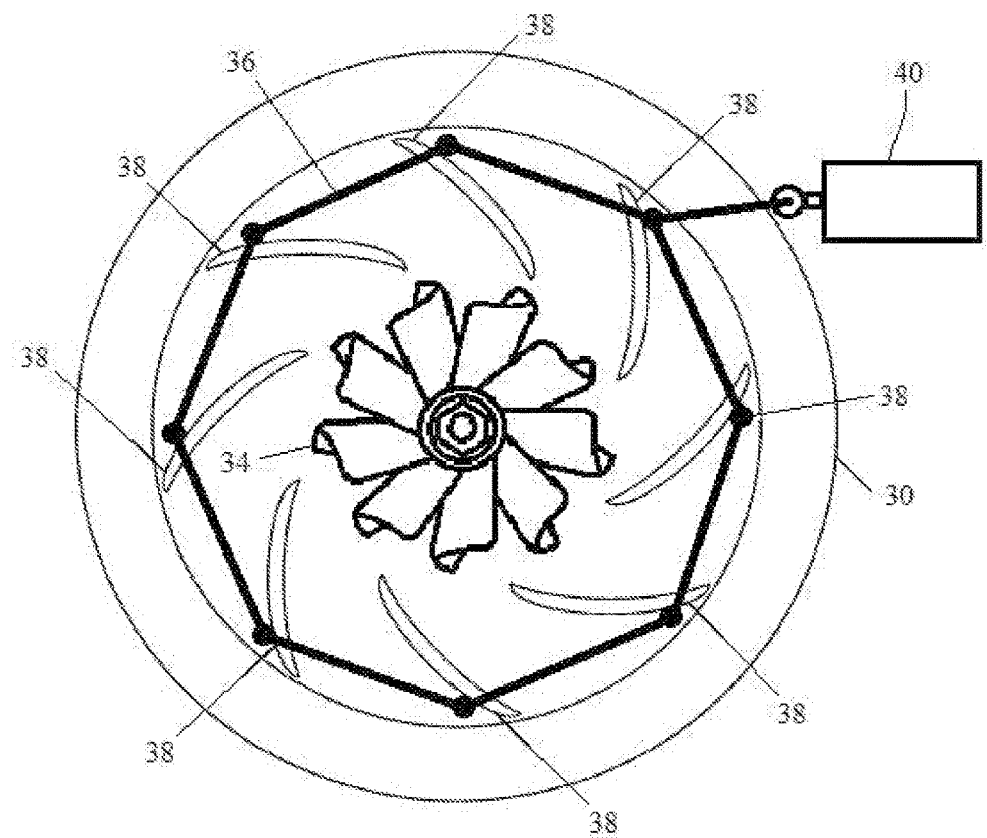
FIG. 2 is an illustration of a VGT implementing an embodiment of the Smart Actuator Learn Command Process with the turbine vanes in a high aspect ratio position, according to the present disclosure, as described herein.
Figure 3:
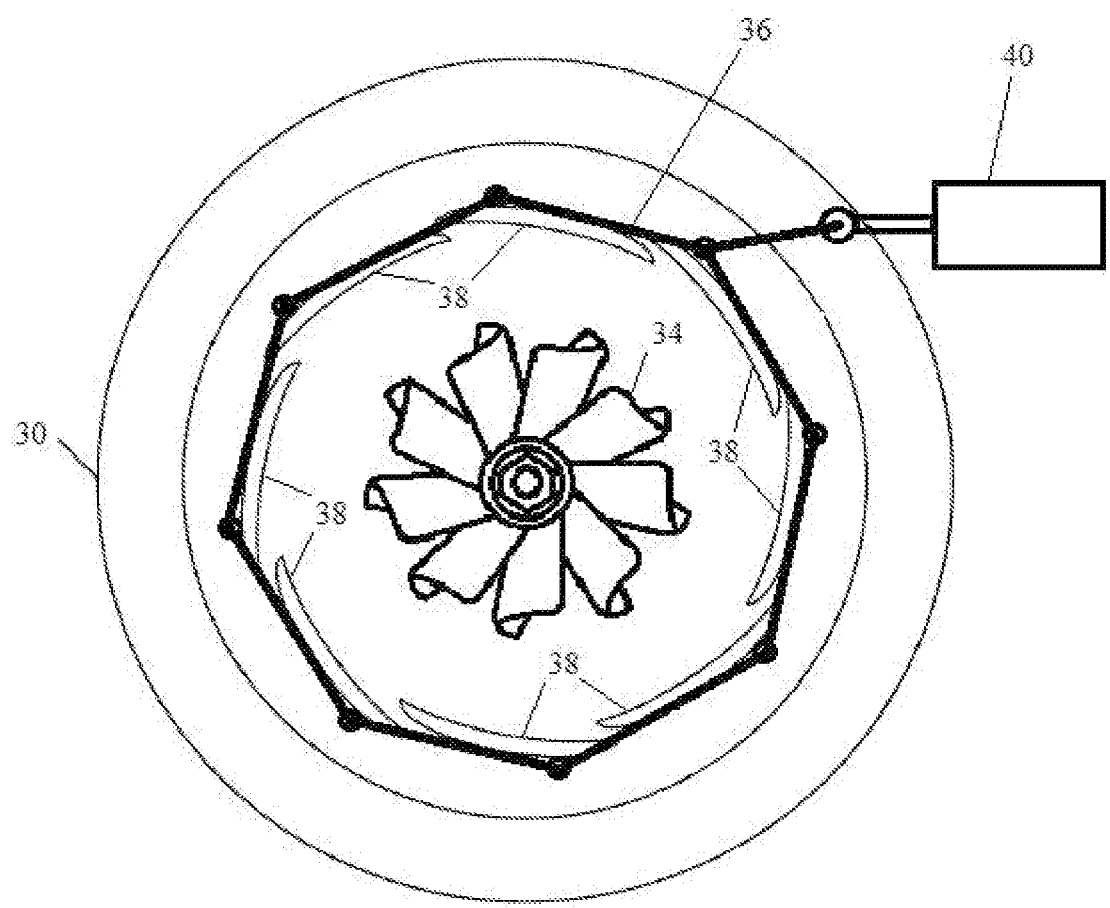
FIG. 3 is an illustration of a VGT implementing an embodiment of the Smart Actuator Learn Command Process with the turbine vanes in a low aspect ratio position, according to the present disclosure, as described herein.

FIGS. 2 and 3 show an embodiment of a VGT 30 using the Smart Actuator Learn Command Process according to the present disclosure, and specifically the turbine 34 and turbine vanes 38 of the VGT 30. A VGT mechanism 36 is connected to and controlled by the VGT actuator 40. In the present non-limiting example, the VGT mechanism 36 is connected to the turbine vanes 38 and controls their angle of attack and effective gap therebetween, thereby controlling the aspect ratio of the VGT 30. Alternative embodiments of the VGT 30 may utilize a differing VGT mechanism 36, such as selectively controlling the axial width of the inlet using an axially sliding wall, or otherwise varying the area of the nozzle. FIG. 2 shows the VGT actuator 40 and the VGT mechanism 36 configured so that the turbine vanes 38 are positioned at a high angle of attack with a large effective gap therebetween. FIG. 3 shows the VGT actuator 40 and the VGT mechanism 36 configured so that the turbine vanes 38 are positioned at a low angle of attack with a small effective gap therebetween.

Figure 4:
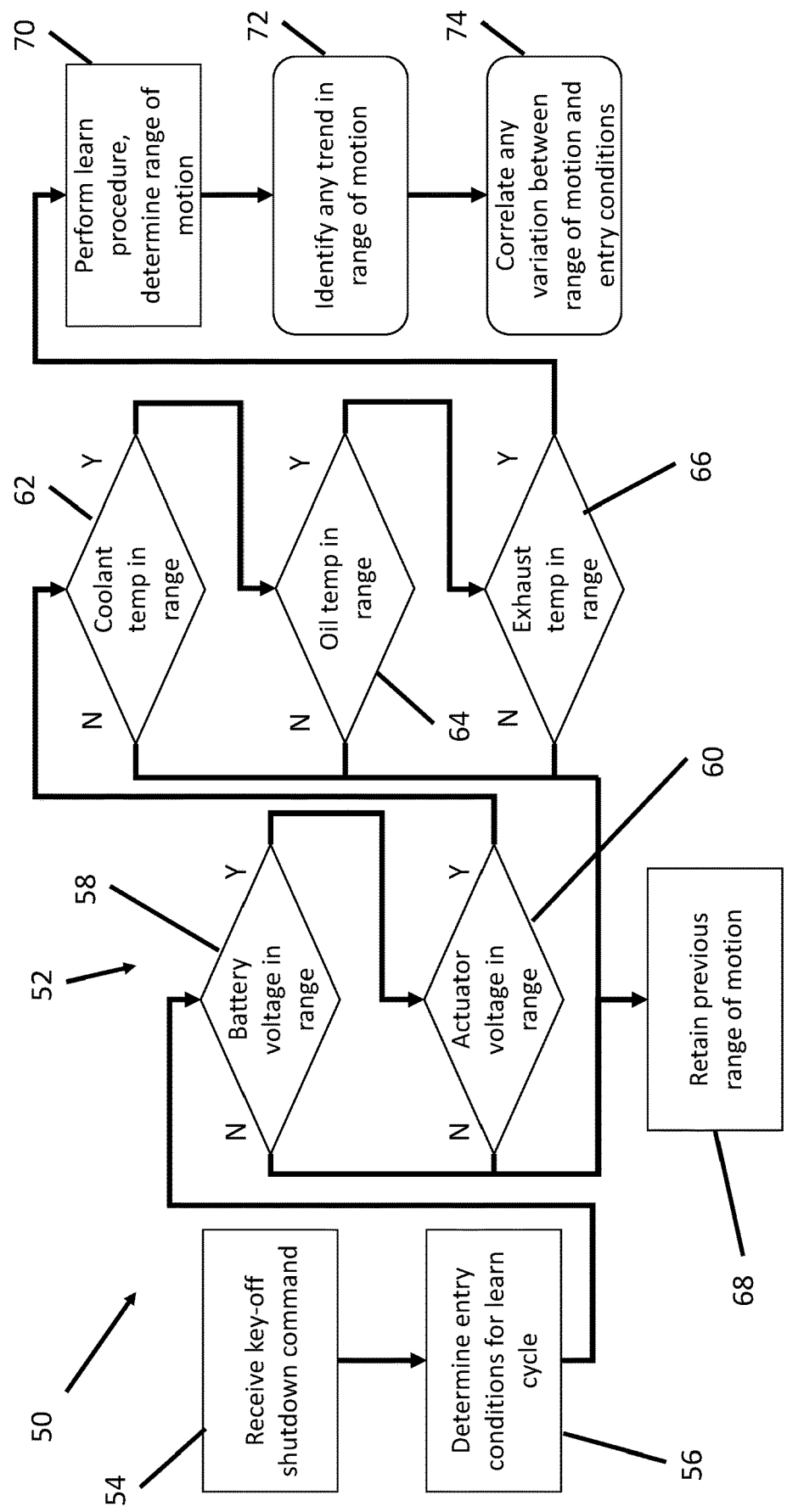
FIG. 4 is flowchart illustrating an embodiment of the Smart Actuator Learn Command Process according to the present disclosure, as described herein.

Turning now to FIG. 4, an embodiment of the Smart Actuator Learn Command Process 50 is shown. In a first step 54, a key-off shutdown command is received by the engine controller (not shown). In a second step 56, a series of entry conditions 52 are evaluated. The entry conditions 52 may include a battery voltage entry condition 58, an actuator voltage entry condition 60, an engine coolant temperature entry condition 62, an oil temperature entry condition 64, and/or an exhaust temperature entry condition 66, as non-limiting examples. If any of the entry conditions 52 are not met, i.e.—the battery voltage is not within a specified range, the actuator voltage is not within a specified range, the engine coolant temperature is not within a specified range, the oil temperature is not within a specified range, or the exhaust temperature is not within a specified range, then the Smart Actuator Learn Command Process 50 may proceed to a retain previous range of motion step 68.

If, however, all of the entry conditions 52 are met, then Smart Actuator Learn Command Process 50 proceeds to the determine range of motion step 70. In the determine range of motion step 70, the VGT actuator cycles the VGT mechanism through its range of motion during the key-off engine shutdown process immediately preceding, during, and/or immediately following actual engine shutdown, as discussed previously. The VGT actuator then reports to the engine controller the available range of motion of the VGT mechanism. In an optional additional step 72, the engine controller implementing an embodiment of the Smart Actuator Learn Command Process 50 may further identify any trends in the available range of motion of the VGT mechanism. In another optional additional step 74, the engine controller implementing an embodiment of the Smart Actuator Learn Command Process 50 may identify, determine, and/or report any correlations between the monitored vehicle and/or engine variables and the available range of motion of the VGT mechanism reported by the VGT actuator.

While the Smart Actuator Learn Command Process, and methods for the use thereof, has been described with respect to at least one embodiment, the Smart Actuator Learn Command Process and its method of use can be further modified within the spirit and scope of this disclosure, as demonstrated previously. This application is therefore intended to cover any variations, uses, or adaptations of the system and method using its general principles. Further, this application is intended to cover such departures from the present disclosure as come within known or customary practice in the art to which the disclosure pertains and which fall within the limits of the appended claims.

What is claimed is:

1. A vehicle having an engine, comprising: a variable geometry turbocharger (VGT) having a VGT mechanism and a VGT actuator connected to the VGT actuator; and
    a controller connected to the VGT actuator and configured to monitor at least one entry condition and, if the at least one entry condition is met, to perform a learn procedure wherein the VGT actuator cycles the VGT mechanism through its range of motion during a key-off shutdown process, and wherein the VGT actuator reports to the controller an available range of motion of the VGT actuator and of the VGT mechanism.

2. The vehicle of claim 1, wherein:
the at least one entry condition being at least one of:
a specified range of voltages of a vehicle battery,
a specified range of voltages at the VGT actuator,
a specified range of temperatures of the engine,
a specified range of engine oil temperatures,
a specified range of engine coolant temperatures, and
a specified range of exhaust gas temperatures.

3. The vehicle of claim 2, wherein:
at least one of the specified range of voltages of the vehicle battery, the specified range of voltages at the VGT actuator, the specified range of temperatures of the engine, the specified range of engine oil temperatures, the specified range of engine coolant temperatures, and the specified range of exhaust gas temperatures being calibratable.

4. The vehicle of claim 1, wherein:
the key-off shutdown process constitutes a period between the beginning of a key-off shutdown command requesting engine shut-down and when the engine shutdown is complete.

5. The vehicle of claim 1, wherein:
the VGT mechanism being connected to at least one turbine vane, and being configured to vary an angle of attack of the at least one turbine vane.

6. The vehicle of claim 1, wherein:
the controller being further configured to retain a previously determined available range of motion of the VGT actuator and of the VGT mechanism if the at least one entry condition is not met.

7. The vehicle of claim 6, wherein:
the controller being further configured to identify any trends in the available range of motion of the VGT actuator and of the VGT mechanism.

8. The vehicle of claim 7, wherein:
the controller being further configured to identify, determine, and report any correlations between at least one monitored vehicle and/or engine variable and the available range of motion of the VGT actuator and the VGT mechanism.

9. An engine of a vehicle, comprising:
a variable geometry turbocharger (VGT) having a VGT mechanism and a VGT actuator connected to the VGT actuator; and
a controller connected to the VGT actuator and configured to monitor at least one entry condition and, if the at least one entry condition is met, to perform a learn procedure wherein the VGT actuator cycles the VGT mechanism through its range of motion following a key-off shutdown command before engine shutdown, and wherein the VGT actuator reports to the controller an available range of motion of the VGT actuator and of the VGT mechanism.

10. The engine of claim 9, wherein:
the at least one entry condition being at least one of:
a specified range of voltages of a vehicle battery,
a specified range of voltages at the VGT actuator,
a specified range of temperatures of the engine,
a specified range of engine oil temperatures,
a specified range of engine coolant temperatures, and
a specified range of exhaust gas temperatures.

11. The engine of claim 10, wherein:
at least one of the specified range of voltages of the vehicle battery, the specified range of voltages at the VGT actuator, the specified range of temperatures of the engine, the specified range of engine oil temperatures, the specified range of engine coolant temperatures, and the specified range of exhaust gas temperatures being calibratable.

12. The engine of claim 9, wherein:
the VGT mechanism being connected to at least one turbine vane, and being configured to vary an angle of attack of the at least one turbine vane.

13. The engine of claim 9, wherein:
the controller being further configured to retain a previously determined available range of motion of the VGT actuator and of the VGT mechanism if the at least one entry condition is not met.

14. The engine of claim 13, wherein:
the controller being further configured to identify any trends in the available range of motion of the VGT actuator and of the VGT mechanism.

15. The engine of claim 14, wherein:
the controller being further configured to identify, determine, and report any correlations between at least one monitored vehicle and/or engine variable and the available range of motion of the VGT actuator and the VGT mechanism.

16. A method of determining the range of motion of a VGT mechanism and a VGT actuator of a VGT, comprising the steps of:
monitoring with a controller at least one entry condition;
if the at least one entry condition is met, performing a learn procedure wherein the VGT actuator cycles the VGT mechanism through its range of motion following a key-off shutdown command and before engine shutdown, and wherein the VGT actuator reports to the controller an available range of motion of the VGT actuator and of the VGT mechanism.

17. The method of claim 16, wherein:
the at least one entry condition being at least one of:
a specified range of voltages of a vehicle battery,
a specified range of voltages at the VGT actuator,
a specified range of temperatures of the engine,
a specified range of engine oil temperatures,
a specified range of engine coolant temperatures,
and a specified range of exhaust gas temperatures.

18. The method of claim 17, wherein:
at least one of the specified range of voltages of the vehicle battery, the specified range of voltages at the VGT actuator, the specified range of temperatures of the engine, the specified range of engine oil temperatures, the specified range of engine coolant temperatures, and the specified range of exhaust gas temperatures being calibratable.

* * * * *